US010370030B2

(12) United States Patent
Rhode et al.

(10) Patent No.: US 10,370,030 B2
(45) Date of Patent: Aug. 6, 2019

(54) TRAILER BACKUP ASSIST CURVATURE CONTROL

(71) Applicants: Ford Global Technologies, LLC, Dearborn, MI (US); The Regents of the University of Michigan, Ann Arbor, MI (US)

(72) Inventors: Douglas Scott Rhode, Farmington Hills, MI (US); David Dean Smit, Ann Arbor, MI (US); Erick Michael Lavoie, Dearborn, MI (US); Martin Fitzpatrick Frey, Saline, MI (US); Thomas Edward Pilutti, Ann Arbor, MI (US); Taehyun Shim, Ann Arbor, MI (US); Matt Y. Rupp, Canton, MI (US); Roger Arnold Trombley, Ann Arbor, MI (US)

(73) Assignees: Ford Global Technologies, LLC, Dearborn, MI (US); The Regents of the University of Michigan Office Tech. Transfer, University of Michigan, Ann Arbor, MI (US)

( * ) Notice: Subject to any disclaimer, the term of this patent is extended or adjusted under 35 U.S.C. 154(b) by 456 days.

(21) Appl. No.: 14/482,604

(22) Filed: Sep. 10, 2014

(65) Prior Publication Data
US 2014/0379219 A1    Dec. 25, 2014

Related U.S. Application Data

(63) Continuation of application No. 13/336,060, filed on Dec. 23, 2011, now Pat. No. 8,909,426.
(Continued)

(51) Int. Cl.
G06F 19/00    (2018.01)
B62D 13/06    (2006.01)
(Continued)

(52) U.S. Cl.
CPC ............... B62D 13/06 (2013.01); B62D 1/22 (2013.01); B62D 15/027 (2013.01); *B60W 30/06* (2013.01);
(Continued)

(58) Field of Classification Search
CPC ........ B62D 13/06; B62D 1/22; B62D 15/027; B60W 30/06; B60W 30/18036;
(Continued)

(56) References Cited

U.S. PATENT DOCUMENTS 3,542,390 A    11/1970    Fikse et al.
3,756,624 A    9/1973    Taylor
(Continued)

FOREIGN PATENT DOCUMENTS

CN    202159367 U    3/2012
DE    3923676 A1    1/1991
(Continued)

OTHER PUBLICATIONS

"Ford Super Duty: Truck Technologies", Brochure, Sep. 2011, pp. 1-2.
(Continued)

*Primary Examiner* — Ronnie M Mancho
(74) *Attorney, Agent, or Firm* — Raymond Coppiellie; Price Heneveld LLP

(57) ABSTRACT

A vehicle has a trailer backup steering input apparatus, a trailer backup assist control module coupled to the a trailer backup steering input apparatus, and an electric power assist steering system coupled to the trailer backup assist control module and. The trailer backup steering input apparatus is configured for outputting a trailer path curvature signal approximating a desired curvature for a path of travel of a trailer towably coupled to the vehicle. The trailer backup assist control module is configured for determining vehicle
(Continued)

steering information as a function of the trailer path curvature signal. The electric power assist steering system is configured for controlling steering of steered wheels of the vehicle as a function of the vehicle steering information.

3 Claims, 6 Drawing Sheets

Related U.S. Application Data

(60) Provisional application No. 61/477,132, filed on Apr. 19, 2011.

(51) Int. Cl.
| | | |
|---|---|---|
| *B62D 15/02* | (2006.01) | |
| *B62D 1/22* | (2006.01) | |
| *B60W 30/06* | (2006.01) | |
| *B60W 30/18* | (2012.01) | |

(52) U.S. Cl.
CPC ... *B60W 30/18036* (2013.01); *B60W 2300/14* (2013.01); *B60W 2520/22* (2013.01); *B60W 2710/207* (2013.01); *B60Y 2200/147* (2013.01)

(58) Field of Classification Search
CPC ......... B60W 2300/14; B60W 2520/22; B60W 2710/207; B60Y 2200/147
USPC ........... 701/1, 41, 36, 42; 348/148; 180/308, 180/204; 280/444, 419, 400; 345/184, 345/156; 704/235; 74/471 XY, 473.12; 200/61.88
See application file for complete search history.

(56) References Cited

U.S. PATENT DOCUMENTS

| | | | |
|---|---|---|---|
| 3,860,257 A | 1/1975 | Mesly | |
| 3,944,972 A | 3/1976 | Chandler | |
| 4,042,132 A | 8/1977 | Bohman et al. | |
| 4,212,483 A * | 7/1980 | Howard | 280/444 |
| 4,277,804 A | 7/1981 | Robison | |
| 4,518,044 A | 5/1985 | Wiegardt et al. | |
| 4,735,432 A | 4/1988 | Brown | |
| 4,752,080 A | 6/1988 | Rogers | |
| 4,848,499 A | 7/1989 | Martinet et al. | |
| 4,947,097 A | 8/1990 | Tao | |
| 5,001,639 A | 3/1991 | Breen | |
| 5,108,158 A | 4/1992 | Breen | |
| 5,246,242 A | 9/1993 | Penzotti | |
| 5,247,442 A | 9/1993 | Kendall | |
| 5,261,495 A | 11/1993 | Szymczak | |
| 5,270,689 A | 12/1993 | Hermann | |
| 5,313,389 A | 5/1994 | Yasui | |
| 5,427,195 A * | 6/1995 | Paul et al. | 180/308 |
| 5,558,350 A | 9/1996 | Kimbrough et al. | |
| 5,579,228 A | 11/1996 | Kimbrough et al. | |
| 5,586,814 A | 12/1996 | Steiner | |
| 5,957,232 A | 9/1999 | Shimizu et al. | |
| 6,042,196 A | 3/2000 | Nakamura et al. | |
| 6,056,371 A | 5/2000 | Lin et al. | |
| 6,292,094 B1 | 9/2001 | Deng et al. | |
| 6,351,698 B1 | 2/2002 | Kubota et al. | |
| 6,409,288 B2 | 6/2002 | Yoshida et al. | |
| 6,494,476 B2 | 12/2002 | Masters et al. | |
| 6,498,977 B2 | 12/2002 | Wetzel et al. | |
| 6,567,731 B2 | 5/2003 | Chandy | |
| 6,636,197 B1 * | 10/2003 | Goldenberg et al. | 345/156 |
| 6,838,979 B2 | 1/2005 | Deng et al. | |
| 6,854,557 B1 | 2/2005 | Deng et al. | |
| 6,904,823 B2 * | 6/2005 | Levin et al. | 74/471 XY |
| 7,032,705 B2 | 4/2006 | Zheng et al. | |
| 7,038,667 B1 * | 5/2006 | Vassallo et al. | 345/184 |
| 7,085,634 B2 | 8/2006 | Endo et al. | |
| 7,117,077 B2 | 10/2006 | Michi et al. | |
| 7,136,754 B2 | 11/2006 | Hahn et al. | |
| 7,139,650 B2 | 11/2006 | Lubischer | |
| 7,154,385 B2 | 12/2006 | Lee et al. | |
| 7,165,820 B2 | 1/2007 | Rudd, III | |
| 7,191,865 B2 | 3/2007 | Spark | |
| 7,219,913 B2 | 5/2007 | Atley | |
| 7,225,891 B2 | 6/2007 | Gehring et al. | |
| 7,255,061 B2 | 8/2007 | Denton | |
| 7,309,075 B2 | 12/2007 | Ramsey | |
| 7,310,084 B2 | 12/2007 | Shitanaka et al. | |
| 7,315,299 B2 | 1/2008 | Sunda et al. | |
| 7,319,927 B1 | 1/2008 | Sun et al. | |
| 7,436,298 B2 | 10/2008 | Yuasa et al. | |
| 7,489,309 B2 * | 2/2009 | Levin et al. | 345/184 |
| 7,550,686 B2 | 6/2009 | Girke et al. | |
| 7,690,737 B2 | 4/2010 | Lu | |
| 7,715,953 B2 * | 5/2010 | Shepard | B60D 1/58 280/400 |
| 7,793,965 B2 | 9/2010 | Padula | |
| 7,827,917 B1 | 11/2010 | Henderson | |
| 7,837,004 B2 | 11/2010 | Yasuda | |
| 7,932,623 B2 | 4/2011 | Burlak et al. | |
| 7,969,326 B2 | 6/2011 | Sakakibara | |
| 8,010,253 B2 | 8/2011 | Lundquist | |
| 8,033,955 B2 | 10/2011 | Farnsworth | |
| 8,036,792 B2 | 10/2011 | Dechamp | |
| 8,108,116 B2 | 1/2012 | Mori et al. | |
| 8,138,865 B2 | 3/2012 | North et al. | |
| 8,170,726 B2 | 5/2012 | Chen et al. | |
| 8,188,850 B2 | 5/2012 | Smith | |
| 8,244,442 B2 | 8/2012 | Craig et al. | |
| 8,246,226 B2 | 8/2012 | Stempinski | |
| 8,260,518 B2 | 9/2012 | Englert | |
| 8,267,485 B2 | 9/2012 | Barlsen et al. | |
| 8,280,607 B2 | 10/2012 | Gatti et al. | |
| 8,374,749 B2 | 2/2013 | Tanaka | |
| 8,430,792 B2 | 4/2013 | Noll | |
| 8,469,125 B2 | 6/2013 | Yu et al. | |
| 8,519,948 B2 | 8/2013 | Cruz-Hernandez et al. | |
| 8,571,758 B2 | 10/2013 | Klier et al. | |
| 8,752,989 B2 | 6/2014 | Roberts et al. | |
| 8,755,982 B2 | 6/2014 | Heckel et al. | |
| 8,755,984 B2 | 6/2014 | Rupp et al. | |
| 8,786,417 B2 | 7/2014 | Holmen et al. | |
| 8,798,860 B2 * | 8/2014 | Dechamp | B62D 13/06 180/204 |
| 8,909,426 B2 | 12/2014 | Rhode et al. | |
| 8,930,140 B2 | 1/2015 | Trombley et al. | |
| 8,972,109 B2 * | 3/2015 | Lavoie et al. | 701/41 |
| 9,102,271 B2 | 8/2015 | Trombley | |
| 9,108,598 B2 | 8/2015 | Headley | |
| 9,132,856 B2 | 9/2015 | Shepard | |
| 9,248,858 B2 | 2/2016 | Lavoie et al. | |
| 9,315,212 B1 | 4/2016 | Kyrtsos et al. | |
| 9,335,162 B2 | 5/2016 | Kyrtsos et al. | |
| 9,340,228 B2 | 5/2016 | Xu et al. | |
| 2001/0037164 A1 | 11/2001 | Hecker | |
| 2001/0052434 A1 | 12/2001 | Ehrlich et al. | |
| 2004/0093139 A1 | 5/2004 | Wildey et al. | |
| 2004/0136175 A1 | 7/2004 | Lewis et al. | |
| 2004/0189595 A1 | 9/2004 | Yuasa et al. | |
| 2004/0215374 A1 | 10/2004 | Shepard | |
| 2005/0000738 A1 | 1/2005 | Gehring et al. | |
| 2005/0206225 A1 | 9/2005 | Offerle et al. | |
| 2005/0206229 A1 | 9/2005 | Lu et al. | |
| 2005/0209763 A1 | 9/2005 | Offerle et al. | |
| 2005/0236201 A1 | 10/2005 | Spannheimer et al. | |
| 2005/0236896 A1 | 10/2005 | Offerle et al. | |
| 2006/0092129 A1 | 5/2006 | Choquet et al. | |
| 2006/0103511 A1 | 5/2006 | Lee et al. | |
| 2006/0142936 A1 | 6/2006 | Dix | |
| 2007/0027581 A1 | 2/2007 | Bauer et al. | |
| 2007/0198190 A1 | 8/2007 | Bauer et al. | |
| 2007/0252359 A1 | 11/2007 | Wishart et al. | |
| 2008/0030361 A1 | 2/2008 | Peissner et al. | |
| 2008/0177443 A1 | 7/2008 | Lee et al. | |
| 2008/0231701 A1 * | 9/2008 | Greenwood et al. | 348/148 |
| 2008/0312792 A1 | 12/2008 | Dechamp | |

(56) References Cited

U.S. PATENT DOCUMENTS

| | | |
|---|---|---|
| 2009/0082935 A1 | 3/2009 | Leschuk et al. |
| 2009/0093928 A1 | 4/2009 | Getman et al. |
| 2009/0101429 A1 | 4/2009 | Williams |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0063670 A1 | 3/2010 | Brzezinski et al. |
| 2010/0152989 A1 | 6/2010 | Smith et al. |
| 2010/0222964 A1 | 9/2010 | Dechamp |
| 2011/0087398 A1 | 4/2011 | Lu et al. |
| 2011/0149077 A1 | 6/2011 | Robert |
| 2011/0160956 A1 | 6/2011 | Chung et al. |
| 2011/0257860 A1 | 10/2011 | Getman et al. |
| 2011/0257973 A1* | 10/2011 | Chutorash et al. ........... 704/235 |
| 2012/0030626 A1 | 2/2012 | Hopkins et al. |
| 2012/0041658 A1 | 2/2012 | Turner |
| 2012/0041659 A1 | 2/2012 | Greene |
| 2012/0087480 A1 | 4/2012 | Yang et al. |
| 2012/0095649 A1 | 4/2012 | Klier et al. |
| 2012/0185131 A1* | 7/2012 | Headley ........................ 701/41 |
| 2012/0200706 A1 | 8/2012 | Greenwood et al. |
| 2012/0245796 A1* | 9/2012 | Yu et al. ........................ 701/41 |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0006472 A1 | 1/2013 | McClain et al. |
| 2013/0024064 A1 | 1/2013 | Shepard |
| 2013/0148748 A1 | 6/2013 | Suda |
| 2013/0158803 A1 | 6/2013 | Headley |
| 2013/0158863 A1 | 6/2013 | Skvarce et al. |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088797 A1 | 3/2014 | McClain |
| 2014/0121930 A1 | 5/2014 | Allexi et al. |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0070161 A1 | 3/2015 | Mizuno et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0009288 A1 | 1/2016 | Yu |
| 2016/0052548 A1 | 2/2016 | Singh et al. |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006035021 A1 | 1/2008 |
| DE | 102007029413 A1 | 1/2009 |
| DE | 102008004160 | 8/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| EP | 0418653 A1 | 3/1991 |
| EP | 849144 A2 | 6/1998 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| EP | 1569073 B1 | 9/2014 |
| FR | 2515379 A1 | 4/1983 |
| GB | 2398048 A | 8/2004 |
| GB | 2398049 A | 8/2004 |
| GB | 2398050 A | 8/2004 |
| JP | 09267762 A | 10/1997 |
| JP | 10119739 A | 5/1998 |
| JP | 2003045269 A | 2/2003 |
| JP | 2003175852 A | 6/2003 |
| JP | 2005053454 A | 3/2005 |
| JP | 2007186118 A | 7/2007 |
| JP | 2012166580 A | 9/2012 |
| KR | 20140105199 A | 9/2014 |
| WO | 8503263 A1 | 8/1985 |
| WO | 0044605 A1 | 8/2000 |
| WO | 2012059207 A1 | 5/2012 |
| WO | 2012103193 A1 | 8/2012 |
| WO | 2013186208 A2 | 12/2013 |

OTHER PUBLICATIONS

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

"Understanding Tractor-Trailer Performance", Caterpillar, 2006, pp. 1-28.

Zhe Leng; Minor, M., "A Simple Tractor-Trailer Backing Control Law for Path Following", IEEE, Intelligent Robots and Systems (IROS) IEEE/RSJ International Conference, Oct. 2010, pp. 1-2.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, pp. 1439-1445.

Payne, M.L.;Hung, J.Y, and Bevy, D.M; "Control of a Robot-Trailer System Using a Single Non-Collacted Sensor", IEEE, 38th Annual

(56) References Cited

OTHER PUBLICATIONS

Conference on IEEE Industrial Electronics Society, Oct. 25-28, 2012; pp. 2674-2679.
J. Roh; H. Lee; W. Chung, "Control of a Car with a Trailer Using the Driver Assistance System", IEEE, International Conference on Robotics and Biomimetics; Phuket, Thailand, Dec. 2011, pp. 2890-2895.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, pp. 1-2.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, pp. 1-1.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
"2012 Edge—Trailer Towing Selector", Brochure, Preliminary 2012 RV & Trailer Towing Guide Information, pp. 1-3.
"Optionally Unmanned Ground Systems for any Steering-Wheel Based Vehicle" Universal. Unmanned., Kairos Autonomi, website: http://www.kairosautonomi.com/pronto4_system.html[Sep. 26, 2014 3:22:48 PM], 2008, pp. 1-2.
Haviland, G S, "Automatic Brake Control for Trucks—What Good is It?", TRID, Society of Automotive Engineers, Sep. 1968, pp. 1-1.
Divelbiss, A.W.; Wen, J.T.; "Trajectory Tracking Control of a Car-Trailer System", IEEE, Control Systems Technology, Aug. 6, 2002, vol. 5, No. 3, pp. 269-278.
Olof Enqvist, "AFS-Assisted Trailer Reversing," Institutionen för systemteknik Deartment of Electrical Engineering, Jan. 27, 2006, pp. 1-57.
Cedric Pradalier and Kane Usher, "Experiments in Autonomous Reversing of a Tractor-Trailer System", 6th International Conference on Field and Service Robotics, inria-00195700, Version 1, Dec. 2007, pp. 1-10.
Zhe Leng, Mark Minor, A Simple Tractor-Trailer Backing Control Law for Path Following, Oct. 18-22, 2010, 5538-5542, The 2010 IEEE/RJS International Conference on Intelligent Robots and Systems, Taipei, Taiwan.
Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pgs.
Guanrong, Chen; Zhang, Dellin; "Backing up a truck-trailer with suboptimal distance trajectories" IEEE, Aug. 6, 2002, New Orleans, LA, 1 pg.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pgs.
A. Gonzalez-Cantos, A.Ollero, "Backing-Up Maneuvers of Autonomous Tractor-Trailer Vehicles Using the Qualitative Theory of Nonlinear Dynamical Systems", ACM Digital Library, International Journal of Robotics Research, Jan. 2009, vol. 28, No. 1, 2 pgs.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pgs.
Audi Full Luminated Glow LED Badge Light Emblem, webpage, http://parts.worldtuningfans.com/aud-full-illuminated-glow-led-badge-light-emblem-3125-p.asp#.VAm6AGMyCZU [accessed from internet: Aug. 18, 2014].
Dieter Zoebel, David Polock, Philipp Wojke, "Steering Assistance for Backing Up Articulated Vehicles", Systemics, Cybernetics and Informatics, Universitaet Koblenz-Landau, Germany, 2003, vol. 1, No. 5, pp. 101-106.
SH. Azadi, H.R. Rezaei Nedamani, and R Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

* cited by examiner

TRAILER BACKUP ASSIST CURVATURE CONTROL

CROSS-REFERENCE TO RELATED APPLICATIONS

This patent application is a continuation of U.S. patent application No. 13/336,060, which was filed on Dec. 23, 2011, entitled "Trailer Path Curvature Control for Trailer Backup Assist," now U.S. Pat. No. 8,909,426, which claims benefit from U.S. Provisional Patent Application No. 61/477,132, which was filed Apr. 19, 2011, entitled "Trailer Backup Assist Curvature Control," and which has a common applicant herewith and is hereby incorporated by reference in its entirety.

FIELD OF THE INVENTION

The disclosures made herein relate generally to steering assist technologies in vehicles and, more particularly, to trailer path curvature control for trailer backup assist.

BACKGROUND OF THE INVENTION

It is well-known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jackknife condition occurs. Another reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner. To this end, some known trailer backup assist systems operate under a requirement that a trailer back-up path is known before backing of the trailer commences such as, for example, from a map or a path planning algorithm. Undesirably, such implementations of the trailer backup assist systems are known to have a relatively complex Human Machine Interface (HMI) to specify the path, obstacles and/or goal of the backup maneuver. Furthermore, such systems also require some way to determine how well the desired path is being followed and to know when the desired goal, or stopping point and orientation, has been met, using approaches such as cameras, inertial navigation, or high precision GPS. These requirements lead to a relatively complex and costly system.

Therefore, implementing trailer backup assist using a trailer path curvature control approach that is relatively simple and that enables an intuitive vehicle operator interface would be advantageous, desirable and useful.

SUMMARY OF THE INVENTION

Embodiments of the inventive subject matter are directed to trailer backup assist functionality that provides for controlling curvature of a path of a trailer attached to a vehicle. More specifically, trailer backup assist functionality configured in accordance with embodiments of the disclosed subject matter provide for such trailer path curvature control by allowing a driver of the vehicle to specify a desired path of the trailer by inputting a desired trailer path curvature as the backup maneuver of the vehicle and trailer progresses. In response to such path of the trailer being specified by the driver, embodiments of the inventive subject matter control a power assisted steering system (e.g., electric power assisted steering (EPAS) system) of the vehicle for implementing steering angle changes of steered wheels of the vehicle to achieve the specified trailer path. Kinematics of the vehicle and the trailer are used to determine the steering angle changes that are required for achieving the specified trailer path. Accordingly, embodiments of the inventive subject matter provide for implementation of trailer backup assist functionality in a manner that is relatively simple and that enables use of an intuitive vehicle operator interface for specifying trailer path curvature control.

In one embodiment of the inventive subject matter, a method of controlling a path of travel of a trailer towably coupled to a vehicle during backing of the trailer by the vehicle comprises a plurality of operations. An operation is performed for receiving trailer path curvature information characterizing a desired curvature for the path of travel of the trailer and an operation is performed for determining vehicle steering information through assessment of kinematical information of a system defined by the vehicle and the trailer. Assessment of the kinematical information is performed as a function of the trailer path curvature information. Thereafter, an operation is performed for generating a steering command for a steering system of the vehicle as a function of the vehicle steering information.

In another embodiment of the inventive subject matter, an electronic control system having a set of instructions tangibly embodied on a non-transitory processor-readable medium thereof. The set of instructions are accessible from the non-transitory processor-readable medium by at least one data processing device of the electronic controller system for being interpreted thereby. The set of instructions is configured for causing the at least one data processing device to carry out an operation for of operations receiving trailer path curvature information for a trailer towably connected to a vehicle, an operations for determining vehicle steering information, and an operations for generating a steering command for a steering system of the vehicle. The trailer path curvature information characterizes a desired curvature for the path of travel of the trailer during backing of the trailer by the vehicle. The vehicle steering information is determined through assessment of kinematical information of a system defined by the vehicle and the trailer. Such assessment of the kinematical information is performed as a function of the trailer path curvature information. The steering command is generated as a function of the vehicle steering information.

In another embodiment of the inventive subject matter, a vehicle comprises a trailer backup steering input apparatus, a trailer backup assist control module coupled to the a trailer backup steering input apparatus, and an electric power assist steering system coupled to the trailer backup assist control module and. The trailer backup steering input apparatus is configured for outputting a trailer path curvature signal approximating a desired curvature for a path of travel of a trailer towably coupled to the vehicle. The trailer backup assist control module is configured for determining vehicle steering information as a function of the trailer path curvature signal. The electric power assist steering system is configured for controlling steering of steered wheels of the vehicle as a function of the vehicle steering information.

In another embodiment of the inventive subject matter, a trailer backup assist system for a vehicle backing a trailer includes a steering input apparatus that provides a desired curvature for the trailer. The trailer backup assist system also includes a control module that generates a steering command for the vehicle to guide the trailer on the desired curvature based on a hitch angle and a kinematic relationship determined between the vehicle and the trailer.

In another embodiment of the inventive subject matter, a trailer backup assist system for a vehicle backing a trailer includes a camera-based apparatus that determines a hitch angle between a vehicle and a trailer. The trailer backup assist system also includes a steering input apparatus that commands a path of the trailer. Further, the trailer backup assist system includes a control module that generates a steering command for guiding the trailer on the path based on the hitch angle and a kinematic relationship between the vehicle and the trailer. A power-steering system controls steered wheels of the vehicle based on the steering command.

In yet another embodiment of the inventive subject matter, a method of reversing a trailer includes a step of determining a kinematic relationship between a vehicle and the trailer. The method also includes a step of determining a hitch angle between the vehicle and the trailer. Also, the method includes a step of commanding a path of the trailer. In addition, the method includes a step of generating a steering command for guiding the trailer on the path based on the hitch angle and the kinematic relationship. The method further includes a step of controlling steered wheels of the vehicle with a power-steering system based on the steering command.

These and other objects, embodiments, advantages and/or distinctions of the disclosed subject matter will become readily apparent upon further review of the following specification, associated drawings and appended claims.

DETAILED DESCRIPTION OF THE PREFERRED EMBODIMENTS

The inventive subject matter is directed to providing trailer backup assist functionality in a manner that is relatively low cost and that offers an intuitive user interface. In particular, such trailer backup assist functionality provides for controlling curvature of a path of travel of a trailer attached to a vehicle (i.e., trailer path curvature control) by allowing a driver of the vehicle to specify a desired path of the trailer by inputting a desired trailer path curvature as the backup maneuver of the vehicle and trailer progresses. Although a control knob, a set of virtual buttons, or a touch screen can each be implemented for enabling trailer path curvature control, the inventive subject matter is not unnecessarily limited to any particular configuration of interface through which a desired trailer path curvature is inputted. Furthermore, in the case where a steering wheel can be mechanically decoupled from steered wheels of the vehicle, the steering wheel can also be used as an interface through which a desired trailer path curvature is inputted. As will be discussed herein in greater detail, kinematical information of a system defined by the vehicle and the trailer are used to calculate a relationship (i.e., kinematics) between the trailer's curvature and the steering angle of the vehicle for determining steering angle changes of the vehicle for achieving the specified trailer path. Steering commands corresponding to the steering angle changes are used for controlling a steering system of the vehicle (e.g., electric power assisted steering (EPAS) system) of the vehicle for implementing steering angle changes of steered wheels of the vehicle to achieve (e.g., to approximate) the specified path of travel of the trailer.

Figure 1:
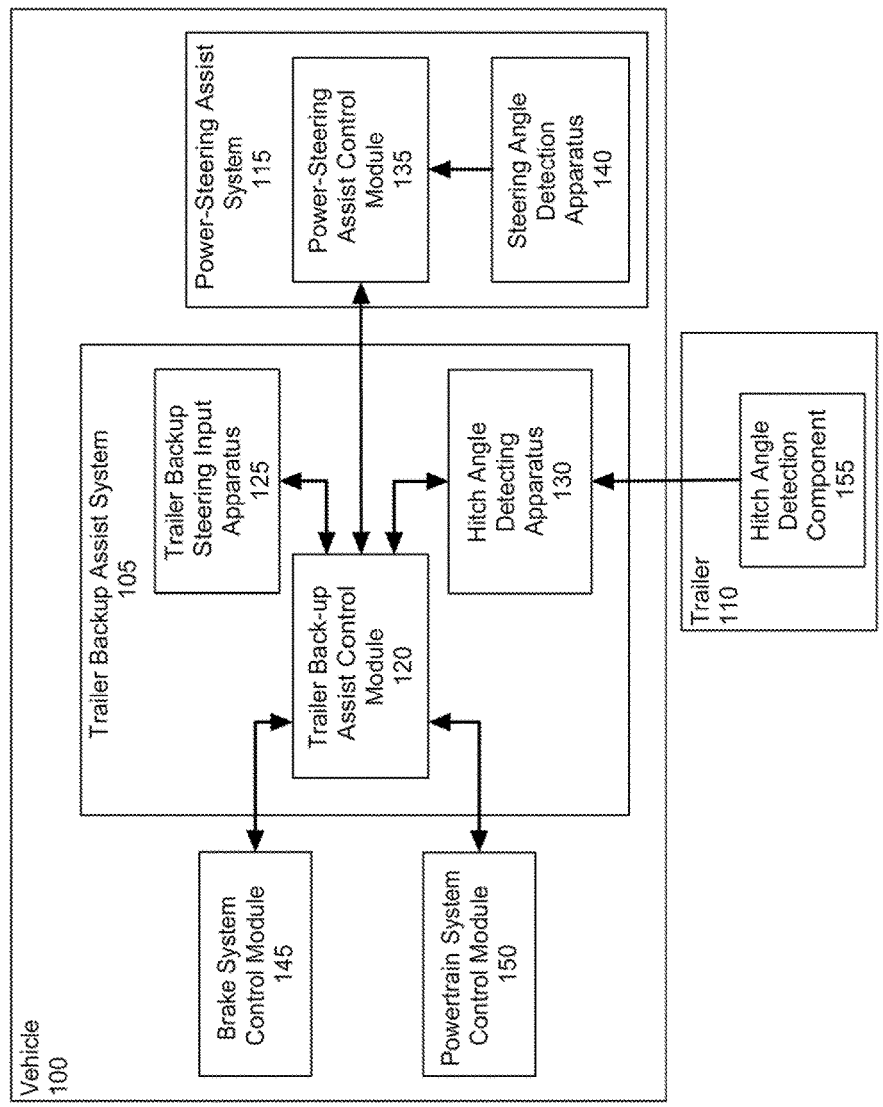
FIG. 1 shows a vehicle configured for performing trailer backup assist functionality in accordance with an embodiment of the inventive subject matter embodiment.

Referring to FIG. 1, an embodiment of a vehicle 100 configured for performing trailer backup assist functionality in accordance with the inventive subject matter is shown. A trailer backup assist system 105 of the vehicle 100 controls the curvature of path of travel of the trailer 110 that is attached to the vehicle 100. Such control is accomplished through interaction of a power assisted steering system 115 of the vehicle 100 and the trailer backup assist system 105. During operation of the trailer backup assist system 105 while the vehicle 100 is being reversed, a driver of the vehicle 100 is sometimes limited in the manner in which he/she can make steering inputs via a steering wheel of the vehicle 100. This is because in certain vehicles the trailer backup assist system 105 is in control of the power assisted steering system 115 and the power assisted steering system 115 is directly coupled to the steering wheel (i.e., the steering wheel of the vehicle 100 moves in concert with steered wheels of the vehicle 100). As is discussed below in greater detail, a human machine interface (HMI) of the backup assist system 105 is used for commanding changes in curvature of a path of the trailer 110 such as a knob, thereby decoupling such commands from being made at the steering wheel of the vehicle 100. However, some vehicles configured to provide trailer backup assist functionality in accordance with the inventive subject matter will have the capability to selectively decouple steering movement from movement of steerable wheels of the vehicle, thereby allowing the steering wheel to be used for commanding changes in curvature of a path of a trailer during such trailer backup assist.

The trailer backup assist system 105 includes a trailer backup assist control module 120, a trailer backup steering input apparatus 125, and a hitch angle detecting apparatus 130. The trailer backup assist control module 120 is connected to the trailer backup steering input apparatus 125 and the hitch angle detecting apparatus 130 for allowing communication of information therebetween. It is disclosed herein that the trailer backup steering input apparatus can be coupled to the trailer backup assist control module 120 in a wired or wireless manner. The trailer backup assist system control module 120 is attached to a power-steering assist control module 135 of the power-steering assist system 115 for allowing information to be communicated therebetween. A steering angle detecting apparatus 140 of the power-steering assist system 115 is connected to the power-steering assist control module 125 for providing information thereto. The trailer backup assist system is also attached to a brake system control module 145 and a powertrain control module 150 for allowing communication of information therebetween. Jointly, the trailer backup assist system 105, the power-steering assist system 115, the brake system control module 145, the powertrain control module 150 define a trailer backup assist architecture configured in accordance with an embodiment of the inventive subject matter.

The trailer backup assist control module 120 is configured for implementing logic (i.e., instructions) for receiving information from the trailer backup steering input apparatus 125, the hitch angle detecting apparatus 130, the power-steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detecting apparatus 130, the power-steering assist control module 135, the brake system control module 145, and the powertrain control module 150. Thereafter, the vehicle steering information is provided to the power-steering assist control module 135 for affecting steering of the vehicle 100 by the power-steering assist system 115 to achieve a commanded path of travel for the trailer 110.

The trailer backup steering input apparatus 125 provides the trailer backup assist control module 120 with information defining the commanded path of travel of the trailer 110 to the trailer backup assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight path of travel). As will be discussed below in detail, the trailer backup steering input apparatus 125 preferably includes a rotational control input device for allowing a driver of the vehicle 100 to interface with the trailer backup steering input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power-steering assist system configuration that allows a steering wheel to be decoupled from movement of the steered wheels of such a vehicle. Accordingly, the steering wheel can be rotated independent of the manner in which the power-steering assist system of the vehicle controls the steered wheels (e.g., as commanded by vehicle steering information provided by to a power-steering assist system control module from a trailer backup assist system control module configured in accordance with an embodiment of the inventive subject matter). As such, in these types of vehicles where the steering wheel can be selectively decoupled from the steered wheels to allow independent operation thereof, trailer steering information of a trailer backup assist system configured in accordance with the inventive subject matter can be provided through rotation of the steering wheel. Accordingly, it is disclosed herein that in certain embodiments of the inventive subject matter, the steering wheel is an embodiment of a rotational control input device in the context of the inventive subject matter. In such embodiments, the steering wheel would be biased (e.g., by an apparatus that is selectively engagable/activatable) to an at-rest position between opposing rotational ranges of motion.

The hitch angle detecting apparatus 130, which operates in conjunction with a hitch angle detection component 155 of the trailer 110, provides the trailer backup assist control module 120 with information relating to an angle between the vehicle 100 and the trailer 110 (i.e., hitch angle information). In a preferred embodiment, the hitch angle detecting apparatus 130 is a camera-based apparatus such as, for example, an existing rear view camera of the vehicle 100 that images (i.e., visually monitors) a target (i.e., the hitch angle detection component 155) attached the trailer 110 as the trailer 110 is being backed by the vehicle 100. Preferably, but not necessarily, the hitch angle detection component 155 is a dedicated component (e.g., an item attached to/integral with a surface of the trailer 110 for the express purpose of being recognized by the hitch angle detecting apparatus 130. Alternatively, the hitch angle detecting apparatus 130 can be a device that is physically mounted on a hitch component of the vehicle 100 and/or a mating hitch component of the trailer 110 for determining an angle between centerline longitudinal axes of the vehicle 100 and the trailer 110.

The power-steering assist control module 135 provides the trailer backup assist control module 120 with information relating to a rotational position (e.g., angle) of the steering wheel angle and/or a rotational position (e.g., turning angle(s)) of steered wheels of the vehicle 100. In certain embodiments of the inventive subject matter, the trailer backup assist control module 120 can be an integrated component of the power steering assist system 115. For example, the power-steering assist control module 135 can include a trailer back-up assist algorithm for generating vehicle steering information as a function of all or a portion of information received from the trailer backup steering input apparatus 125, the hitch angle detecting apparatus 130, the power-steering assist control module 135, the brake system control module 145, and the powertrain control module 150.

The brake system control module 145 provides the trailer backup assist control module 120 with information relating to vehicle speed. Such vehicle speed information can be determined from individual wheel speeds as monitored by the brake system control module 145. In some instances, individual wheel speeds can also be used to determine a vehicle yaw rate and such yaw rate can be provided to the trailer backup assist control module 120 for use in determining the vehicle steering information. In certain embodiments, the trailer backup assist control module 120 can provide vehicle braking information to the brake system control module 145 for allowing the trailer backup assist control module 120 to control braking of the vehicle 100 during backing of the trailer 110. For example, using the trailer backup assist control module 120 to regulate speed of the vehicle 100 during backing of the trailer 110 can reduce the potential for unacceptable trailer backup conditions. Examples of unacceptable trailer backup conditions include, but are not limited to, a vehicle overspeed condition, a trailer jackknife condition as defined by an angular displacement limit relative to the vehicle 100 and the trailer 110, and the like. It is disclosed herein that the backup assist control module 120 can issue a signal corresponding to a notification (e.g., a warning) of an actual, impending, and/or anticipated unacceptable trailer backup condition.

The powertrain control module 150 interacts with the trailer backup assist control module 120 for regulating speed and acceleration of the vehicle 100 during backing of the trailer 110. As mentioned above, regulation of the speed of the vehicle 100 is necessary to limit the potential for unacceptable trailer backup conditions such as, for example, jackknifing. Similar to high-speed considerations as they relate to unacceptable trailer backup conditions, high acceleration can also lead to such unacceptable trailer backup conditions.

Figure 2:
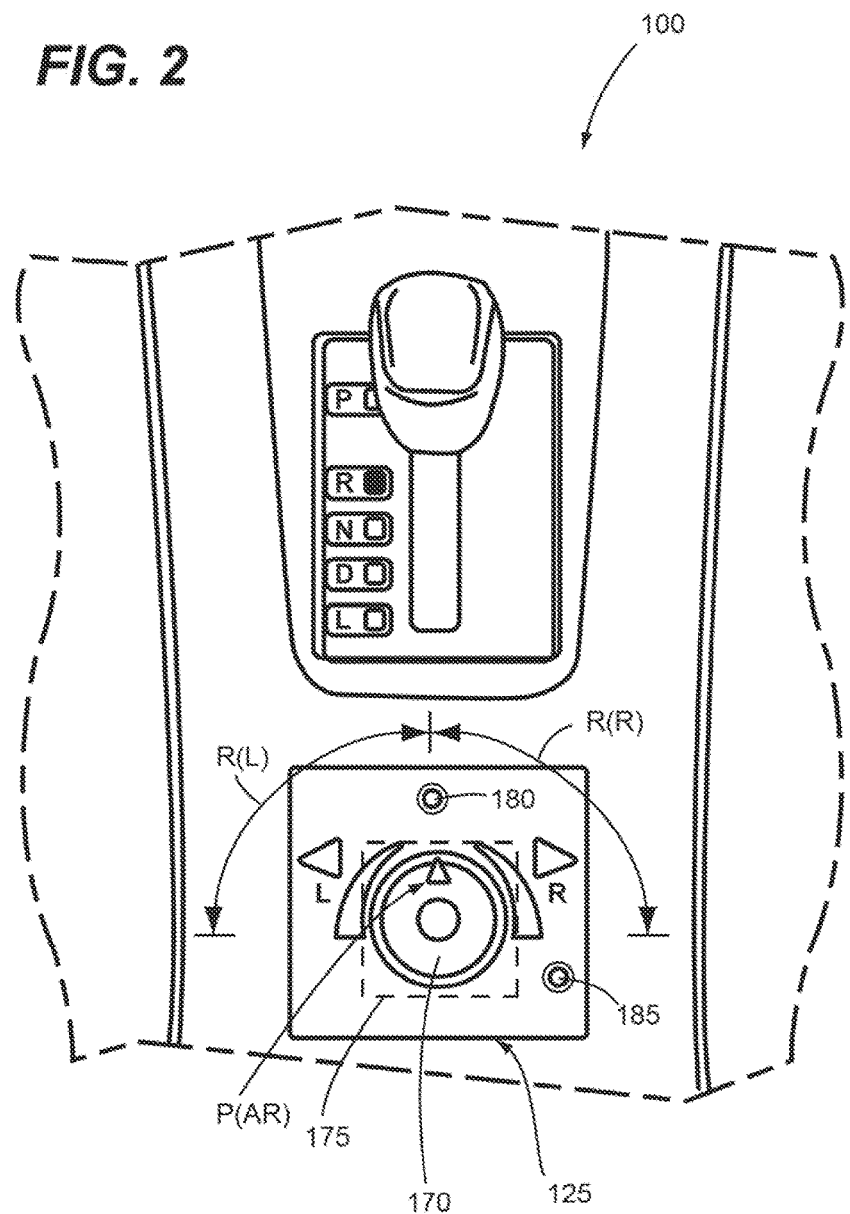
FIG. 2 shows a preferred embodiment of the trailer backup steering input apparatus discussed in reference to FIG. 1.

Referring now to FIG. 2, a preferred embodiment of the trailer backup steering input apparatus 125 discussed in reference to FIG. 1 is shown. A rotatable control element in the form of a knob 170 is coupled to a movement sensing device 175. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer assist backup input apparatus 125 shown in FIG. 1. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 100 should be steered such that the trailer 100 is backed along a substantially straight path as defined by a centerline longitudinal axis of the trailer 110 when the knob 170 was returned to the at-rest position P(AR) and a maximum clockwise and anti-clockwise position of the knob 170 (i.e., limits of the opposing rotational ranges of motion R(R), R(L)) each correspond to a respective movement sensing device signal indicating a tightest radius of curvature (i.e., most acute trajectory) of a path of travel of the trailer 110 that is possible without the corresponding vehicle steering information causing a jackknife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion P(L), P(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 100. In use, as a driver of the vehicle 100 backs the trailer 110, the driver can turn the knob 170 to dictate a curvature of a path of the trailer 110 to follow and returns the knob 170 to the at-rest position P(AR) for causing the trailer 110 to be backed along a straight line. Accordingly, in embodiments of trailer backup assist systems where the steering wheel remains physically coupled to the steerable wheels of a vehicle during backup of an attached trailer, a rotatable control element configured in accordance with the inventive subject matter (e.g., the knob 170) provides a simple and user-friendly means of allowing a driver of a vehicle to input trailer steering commands.

It is disclosed herein that a rotational control input device configured in accordance with embodiments of the inventive subject matter (e.g., the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is in of approaching the zero curvature commanding position, and the like.

It is also disclosed herein that embodiments of the inventive subject matter can be configured with a control input device that is not rotational (i.e., a non-rotational control input device). Similar to a rotational control input device configured in accordance with embodiments of the inventive subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved.

Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, and the like.

The trailer backup steering input apparatus 125 can be configured to provide various feedback information to a driver of the vehicle 100. Examples of situation that such feedback information can indicate include, but are not limited to, a status of the trailer backup assist system 105 (e.g., active, in standby (e.g., when driving forward to reduce the trailer angle), faulted, inactive, etc), that a curvature limit has been reached (i.e., maximum commanded curvature of a path of travel of the trailer 110), etc. To this end, the trailer backup steering input apparatus 125 can be configured to provide a tactile feedback signal (e.g., a vibration through the knob 170) as a warning if any one of a variety of conditions occur. Examples of such conditions include, but are not limited to, the trailer 110 having jack-knifed, the trailer backup assist system 105 has had a failure, the trailer backup assist system 105 or other system of the vehicle 100 has predicted a collision on the present path of travel of the trailer 110, the trailer backup system 105 has restricted a commanded curvature of a trailer's path of travel (e.g., due to excessive speed or acceleration of the vehicle 100), and the like. Still further, it is disclosed that the trailer backup steering input apparatus 125 can use illumination (e.g., an LED 180) and/or an audible signal output (e.g., an audible output device 185) to provide certain feedback information (e.g., notification/warning of an unacceptable trailer backup condition).

Figure 3:
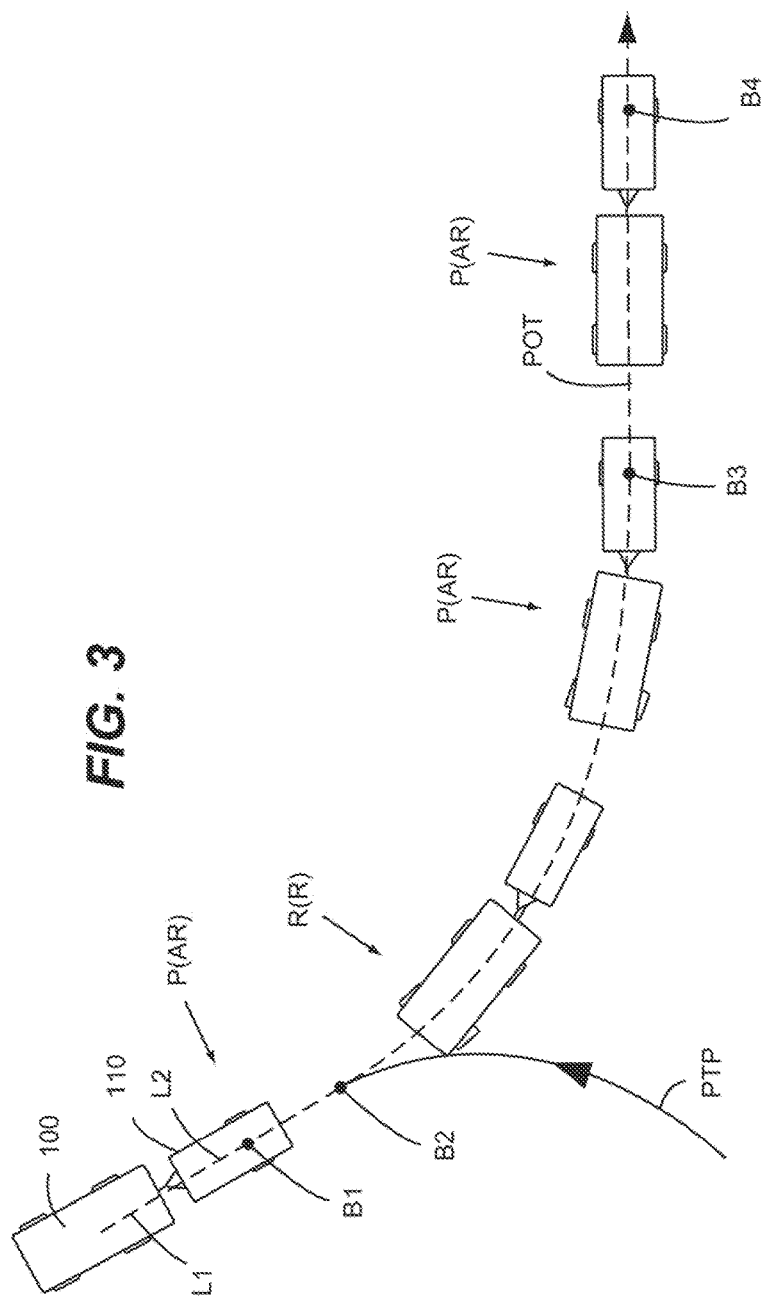
FIG. 3 shows an example of a trailer backup sequence implemented using the trailer backup steering input apparatus discussed in reference to FIG. 2.

Referring now to FIGS. 2 and 3, an example of using the trailer backup steering input apparatus 125 for dictating a curvature of a path of travel (POT) of a trailer (i.e., the trailer 110 shown in FIG. 1) while backing up the trailer with a vehicle (i.e., the vehicle 100 in FIGS. 1 and 2) is shown. In preparation of backing the trailer 110, the driver of the vehicle 100 drives the vehicle 100 forward along a pull-thru path (PTP) to position the vehicle 100 and trailer 110 at a first backup position B1. In the first backup position B1, the vehicle 100 and trailer 110 are longitudinally aligned with each other such that a longitudinal centerline axis L1 of the vehicle 100 is aligned with (e.g., parallel with or coincidental with) a longitudinal centerline axis L2 of the trailer 110. It is disclosed herein that such alignment of the longitudinal axes L1, L2 at the onset of an instance of trailer backup functionality is not a requirement for operability of a trailer backup assist system configured in accordance with the inventive subject matter.

After activating the trailer backup assist system 105 (e.g., before, after, or during the pull-thru sequence), the driver begins to back the trailer 110 by reversing the vehicle 100 from the first backup position B1. So long as the knob 170 of the trailer backup steering input apparatus 125 remains in the at-rest position P(AR), the trailer backup assist system 105 will steer the vehicle 100 as necessary for causing the trailer 110 to be backed along a substantially straight path of travel as defined by the longitudinal centerline axis L2 of the trailer 110 at the time when backing of the trailer 110 began. When the trailer reaches the second backup position B2, the driver rotates the knob 170 to command the trailer 110 to be steered to the right (i.e., a knob position R(R)). Accordingly, the trailer backup assist system 105 will steer the vehicle 100 for causing the trailer 110 to be steered to the right as a function of an amount of rotation of the knob 170 with respect to the at-rest position P(AR), a rate movement of the knob 170, and/or a direction of movement of the knob 170 with respect to the at-rest position P(AR). Similarly, the trailer 110 can be commanded to steer to the left by rotating the knob 170 to the left. When the trailer reaches backup position B3, the driver allows the knob 170 to return to the at-rest position P(AR) thereby causing the trailer backup assist system 105 to steer the vehicle 100 as necessary for causing the trailer 110 to be backed along a substantially straight path of travel as defined by the longitudinal centerline axis L2 of the trailer 110 at the time when the knob 170 was returned to the at-rest position P(AR). Thereafter, the trailer backup assist system 105 steers the vehicle 100 as necessary for causing the trailer 110 to be backed along this substantially straight path to the fourth backup position B4. In this regard, arcuate portions of a path of travel POT of the trailer 110 are dictated by rotation of the knob 170 and straight portions of the path of travel POT are dictated by an orientation of the centerline longitudinal axis L2 of the trailer when the knob 170 is in/returned to the at-rest position P(AR).

Figure 4:
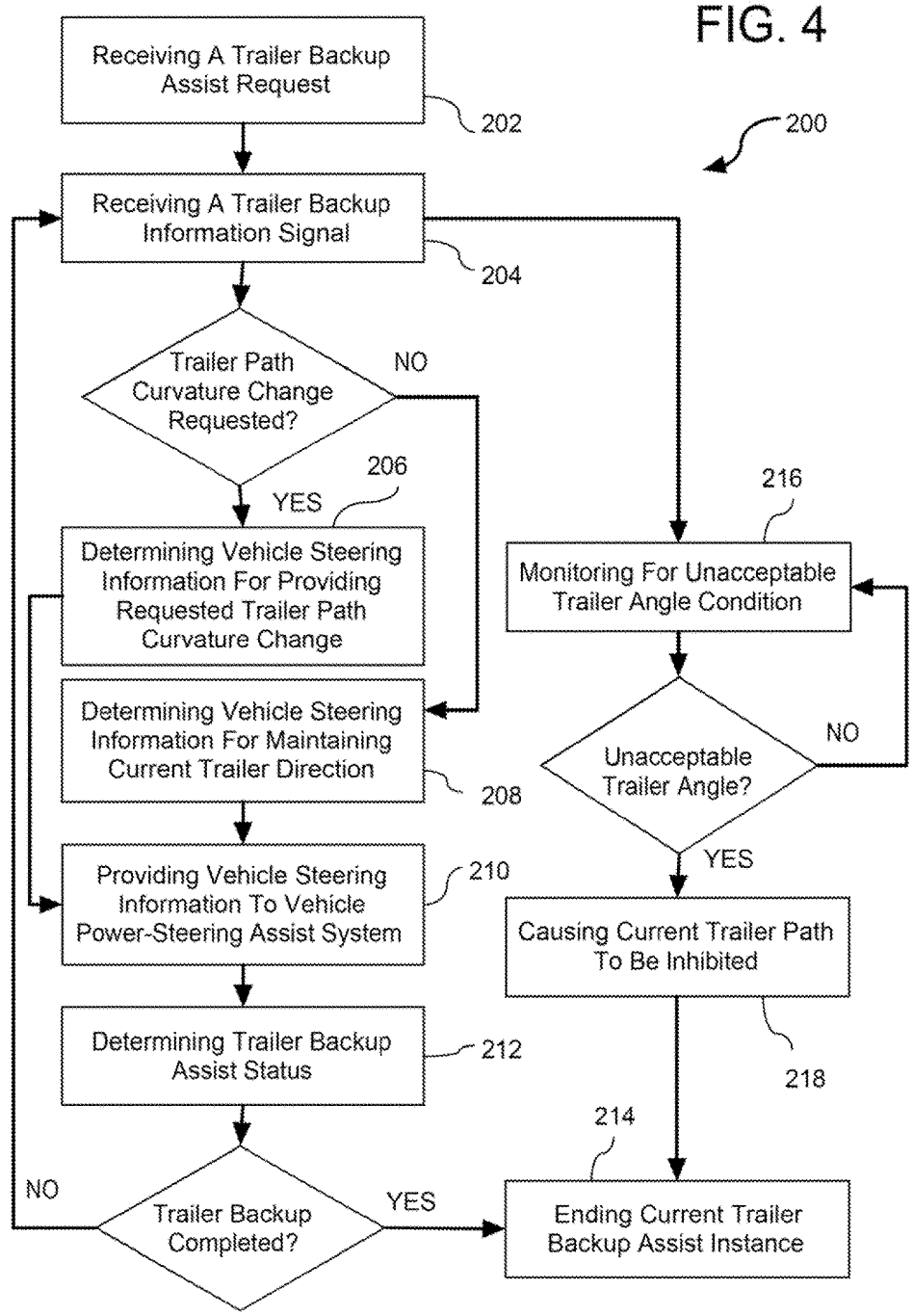
FIG. 4 shows a method for implementing trailer backup assist functionality in accordance with an embodiment of the inventive subject matter.

FIG. 4 shows a method 200 for implementing trailer backup assist functionality in accordance with an embodiment of the inventive subject matter. In a preferred embodiment, the method 200 for implementing trailer backup assist functionality can be carried out using the trailer backup assist architecture discussed above in reference to the vehicle 100 and trailer 110 of FIG. 1. Accordingly, trailer steering information is provided through use of a rotational control input device (e.g., the knob 170 discussed in reference to FIG. 2).

An operation 202 is performed for receiving a trailer backup assist request. Examples of receiving the trailer backup assist request include activating the trailer backup assist system and providing confirmation that the vehicle and trailer are ready to be backed. After receiving a trailer backup assist request (i.e., while the vehicle is being reversed), an operation 204 is performed for receiving a trailer backup information signal. Examples of information carried by the trailer backup information signal include, but are not limited to, information from the trailer backup steering input apparatus 125, information from the hitch angle detecting apparatus 130, information from the power-steering assist control module 135, information from the brake system control module 145, and information from the powertrain control module 150. It is disclosed herein that information from the trailer backup steering input apparatus 125 preferably includes trailer path curvature information characterizing a desired curvature for the path of travel of the trailer, such as provided by the trailer backup steering input apparatus 125 discussed above in reference to FIGS. 1 and 2. In this manner, the operation 204 for receiving the trailer backup information signal can include receiving trailer path curvature information characterizing the desired curvature for the path of travel of the trailer.

If the trailer backup information signal indicates that a change in curvature of the trailer's path of travel is requested (i.e., commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power-steering assist system of the vehicle, followed by an operation 212 being performed for determining the trailer backup assist status. If it is determined that trailer backup is complete, an operation 214 is performed for ending the current trailer backup assist instance. Otherwise the method 200 returns to the operation 204 for receiving trailer backup information. Preferably, the operation for receiving the trailer backup information signal, determining the vehicle steering information, providing the vehicle steering information, and determining the trailer backup assist status are performed in a monitoring fashion (e.g., at a high rate of speed of a digital data processing device). Accordingly, unless it is determined that reversing of the vehicle for backing the trailer is completed (e.g., due to the vehicle having been successfully backed to a desired location during a trailer backup assist instance, the vehicle having to be pulled forward to begin another trailer backup assist instance, etc), the method 200 will continually be performing the operations for receiving the trailer backup information signal, determining the vehicle steering information, providing the vehicle steering information, and determining the trailer backup assist status.

It is disclosed herein that the operation 206 for determining vehicle steering information for providing the requested change in curvature of the trailer's path of travel preferably includes determining vehicle steering information as a function of trailer path curvature information contained within the trailer backup information signal. As will be discussed below in greater detail, determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified trailer path curvature. In this manner, the operation 206 for determining vehicle steering information can be configured for generating information necessary for providing trailer path curvature control in accordance with the inventive subject matter.

In some embodiments of the inventive subject matter, the operation 210 for providing the vehicle steering information to the power-steering assist system of the vehicle causes the steering system to generate a corresponding steering command as a function of the vehicle steering information. The steering command is interpretable by the steering system and is configured for causing the steering system to move steered wheels of the steering system for achieving a steered angle as specified by the vehicle steering information. Alternatively, the steering command can be generated by a controller, module or computer external to the steering system (e.g., a trailer backup assist control module) and be provided to the steering system.

In parallel with performing the operations for receiving the trailer backup information signal, determining the vehicle steering information, providing the vehicle steering information, and determining the trailer backup assist status, the method 200 performs an operation 216 for monitoring the trailer backup information for determining if an unacceptable trailer backup condition exists. Examples of such monitoring include, but are not limited to assessing a hitch angle to determine if a hitch angle threshold is exceeded, assessing a backup speed to determine if a backup speed threshold is exceeded, assessing vehicle steering angle to determining if a vehicle steering angle threshold is exceeded, and the like. If it is determined that an unacceptable trailer backup condition exists, an operation 218 is performed for causing the current path of travel of the trailer to be inhibited (e.g., stopping motion of the vehicle), followed by the operation 214 being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable trailer angle condition is impending or approaching. In one example, if such feedback results in the unacceptable trailer angle condition being remedied prior to achieving a critical condition, the method can continue with providing trailer backup assist functionality in accordance with operations 204-212. Otherwise, the method can proceed to operation 214 for ending the current trailer backup assist instance. In conjunction with performing the operation 214 for ending the current trailer backup assist instance, an operation can be performed for controlling movement of the vehicle to correct or limit a jackknife condition (e.g., steering and/or decelerating the vehicle to preclude the hitch angle from being exceeded).

Turning now to a discussion of a kinematic model used to calculate a relationship between a curvature of a path of travel of a trailer and the steering angle of a vehicle towing the trailer, a low order kinematic model can be desirable for a trailer back-up assist system configured in accordance with some embodiments of the inventive subject matter. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, tires of the vehicle and the trailer having negligible (e.g., no) deformation, actuator dynamics of the vehicle being negligible, the vehicle and the trailer exhibiting negligible (e.g., no) roll or pitch motions.

Figure 5:
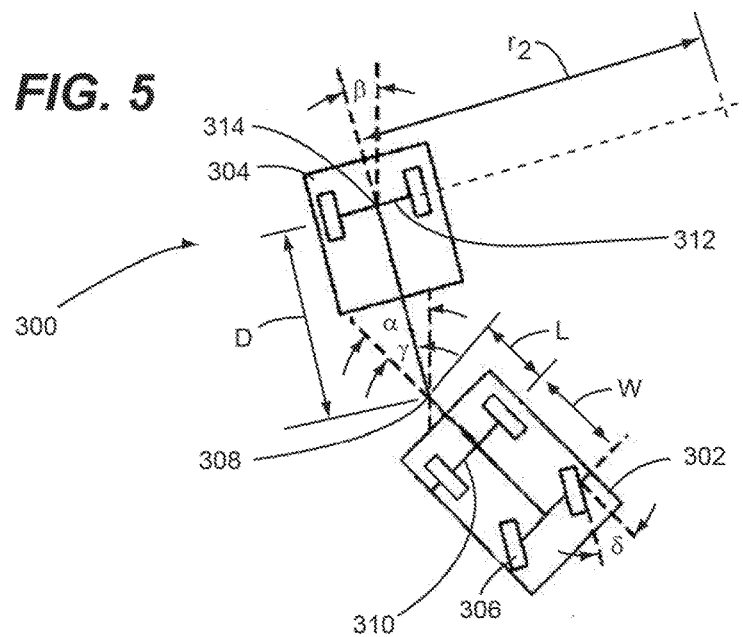
FIG. 5 is a diagrammatic view showing a kinematic model configured for providing information utilized in providing trailer backup assist functionality in accordance with the inventive subject matter.

As shown in FIG. 5, for a system defined by a vehicle 302 and a trailer 304, the kinematic model 300 is based on various parameters associated with the vehicle 302 and the trailer 304. These kinematic model parameters include:

δ: steering angle at steered front wheels 306 of the vehicle 302;

α: yaw angle of the vehicle 302;

β: yaw angle of the trailer 304;

γ: hitch angle (γ=β−α);

W: wheel base of the vehicle 302;

L: length between hitch point 308 and rear axle 310 of the vehicle 302;

D: length between hitch point 308 and axle 312 of the trailer 304; and $r_2$: curvature radius for the trailer 304.

The kinematic model 300 of FIG. 5 reveals a relationship between trailer path radius of curvature $r_2$ at the midpoint 314 of an axle 306 of the trailer 304, steering angle δ of the steered wheels 306 of the vehicle 302, and the hitch angle γ. As shown in the equation below, this relationship can be expressed to provide the trailer path curvature κ2 such that, if γ is given, the trailer path curvature κ2 can be controlled based on regulating the steering angle δ (where β(.) is trailer yaw rate and η(.) is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

Or, this relationship can be expressed to provide the steering angle δ as a function of trailer path curvature η2 and hitch ankle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $\kappa_2$ is determined from the driver input via a trailer backup steering input apparatus. Through the use of the equation for providing steering angle, a corresponding steering command can be generated for controlling a steering system (e.g., an actuator thereof) of the vehicle.

Figure 6:
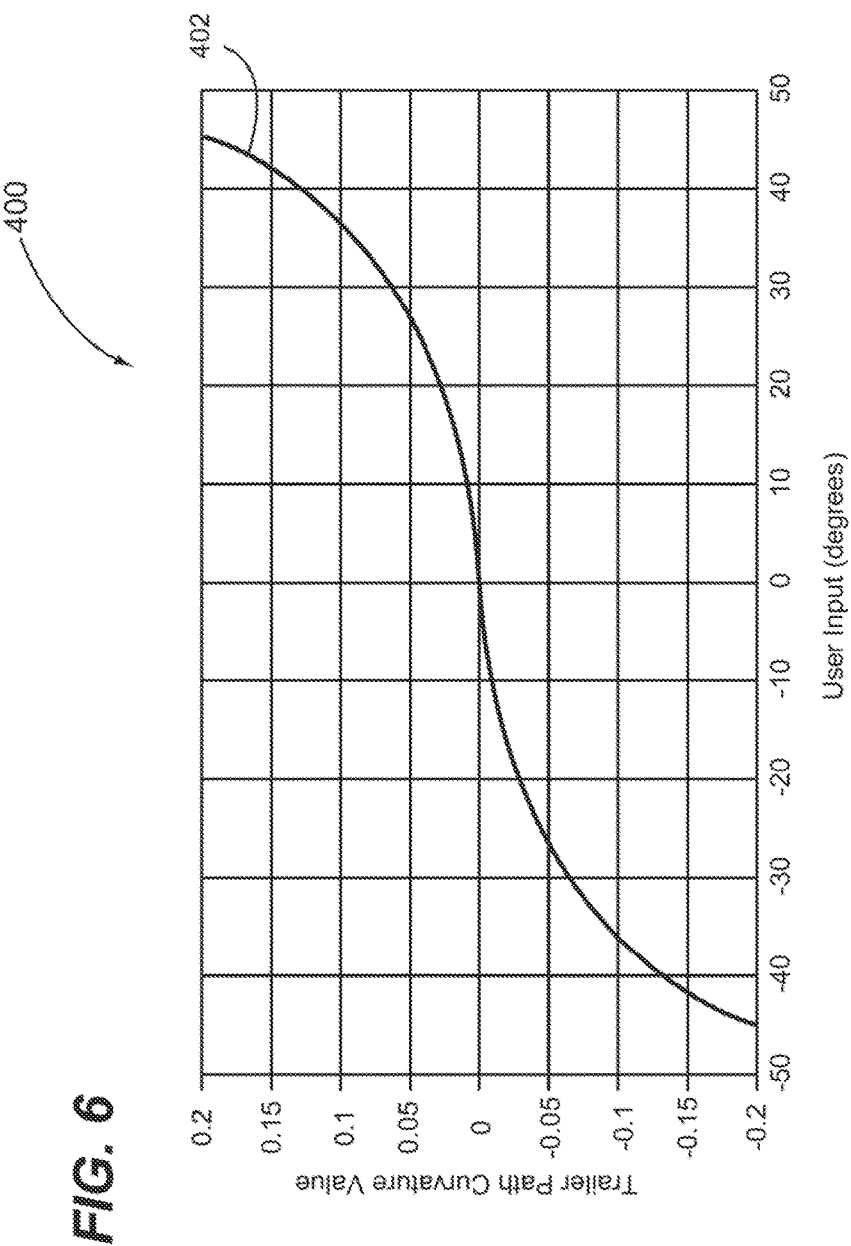
FIG. 6 is a graph showing an example of a trailer path curvature function plot for a rotary-type trailer backup steering input apparatus configured in accordance with the inventive subject matter.

FIG. 6 shown an example of a trailer path curvature function plot 400 for a rotary-type trailer backup steering input apparatus (e.g., the trailer backup steering input apparatus 125 discussed above in reference to FIGS. 1 and 2). A value representing trailer path curvature (e.g., trailer path curvature κ2) is provided as an output signal from the rotary-type trailer backup steering input apparatus as a function of user input movement. In this example, a curve 402 specifying trailer path curvature relative to user input (e.g., amount of rotation) at a rotary input device (e.g., a knob) is defined by a cubic function. However, a skilled person will appreciate that embodiments of the inventive subject matter are not limited to any particular function between a magnitude and/or rate of input at a trailer backup steering input apparatus (e.g., knob rotation) and a resulting trailer path curvature value.

Referring to FIG. 5, in preferred embodiments of the inventive subject matter, it is desirable to limit the potential for the vehicle 302 and the trailer 304 to attain a jackknife angle (i.e., the vehicle/trailer system achieving a jackknife condition). A jackknife angle γ(j) refers to a hitch angle γ that cannot be overcome by the maximum steering input for a vehicle such as, for example, the steered front wheels 306 of the vehicle 302 being moved to a maximum steered angle δ at a maximum rate of steering angle change. The jackknife angle γ(j) is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the axle 312 of the trailer 304. When the hitch angle γ for the vehicle 302 and the trailer 304 achieves or exceeds the jackknife angle γ(j), the vehicle 302 must be pulled forward to reduce the hitch angle γ. Thus, for limiting the potential for a vehicle/trailer system attaining a jackknife angle, it is preferable to control the yaw angle of the trailer while keeping the hitch angle of the vehicle/trailer system relatively small.

Figure 7:
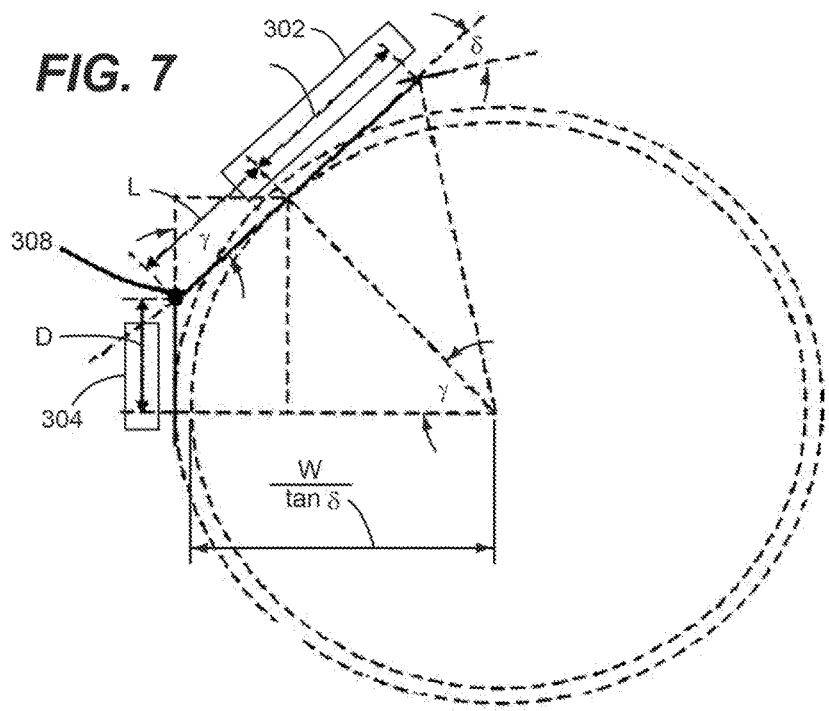
FIG. 7 is a diagrammatic view showing a relationship between hitch angle and steered angle as it relates to determining a jackknife angle for a vehicle/trailer system.

Referring to FIGS. 5 and 7, a steering angle limit for the steered front wheels 306 requires that the hitch angle γ cannot exceed the jackknife angle γ(j), which is also referred to as a critical hitch angle. Thus, under the limitation that the hitch angle γ cannot exceed the jackknife angle γ(j), the jackknife angle γ(j) is the hitch angle γ that maintains a circular motion for the vehicle/trailer system when the steered wheels 306 are at a maximum steering angle δ(max). The steering angle for circular motion with hitch angle is defined by the following equation.

$$\tan\delta_{max} = \frac{w\sin\gamma_{max}}{D + L\cos\gamma_{max}}$$

Solving the above equation for hitch angle allows jackknife angle γ(j) to be determined. This solution, which is shown in the following equation, can be used in implementing trailer backup assist functionality in accordance with the inventive subject matter for monitoring hitch angle in relation to jackknife angle.

$$\cos\bar{\gamma} = \frac{-b \pm \sqrt{b^2 - 4ac}}{2a}$$

where, $a = L^2\tan^2\delta(max) + W^2;$ $b = 2\ LD\ \tan^2\delta(max);$ and $c = D^2\tan^2\delta(max) - W^2.$ Referring now to instructions processable by a data processing device, it will be understood from the disclosures made herein that methods, processes and/or operations adapted for carrying out trailer backup assist functionality as disclosed herein are tangibly embodied by non-transitory computer readable medium having instructions thereon that are configured for carrying out such functionality. The instructions are tangibly embodied for carrying out the method 200 disclosed and discussed above and can be further configured for limiting the potential for a jackknife condition such as, for example, by monitoring jackknife angle through use of the equations discussed in reference to FIGS. 5 and 7. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) configured for carrying out trailer backup assist functionality in accordance with the inventive subject matter.

In a preferred embodiment of the inventive subject matter, a trailer back-up assist control module (e.g. ,the trailer back-up assist control module 120 discussed above in reference to FIG. 1) comprises such a data processing device, such a non-transitory computer readable medium, and such instructions on the computer readable medium for carrying out trailer backup assist functionality (e.g., in accordance with the method 200 discussed above in reference to FIG. 2). To this end, the trailer back-up assist control module can comprise various signal interfaces for receiving and outputting signals. A trailer back-up assist control module in the context of the inventive subject matter can be any control module of an electronic control system that provides for trailer back-up assist control functionality in accordance with the inventive subject matter. Furthermore, it is disclosed herein that such a control functionality can be implemented within a standalone control module (physically and logically) or can be implemented logically within two or more separate but interconnected control modules (e.g., of an electronic control system of a vehicle) In one example, trailer back-up assist control module in accordance with the inventive subject matter is implemented within a standalone controller unit that provides only trailer backup assist functionality. In another example, trailer backup assist functionality in accordance with the inventive subject matter is implemented within a standalone controller unit of an electronic control system of a vehicle that provides trailer backup assist functionality as well as one or more other types of system control functionality of a vehicle (e.g., anti-lock brake system functionality, steering power assist functionality, etc). In still another example, trailer backup assist functionality in accordance with the inventive subject matter is implemented logically in a distributed manner whereby a plurality of control units, control modules, computers, or the like (e.g., an electronic control system) jointly carry out operations for providing such trailer backup assist functionality.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of reversing a trailer connected to a vehicle, comprising:
    determining a kinematic relationship between the vehicle and the trailer based on at least a trailer length of the trailer, a wheel base distance of the vehicle and a steering angle of the vehicle;
    determining a hitch angle between the vehicle and the trailer;
    commanding a path of the trailer based on a user input, wherein commanding the path includes providing a desired curvature of the path of the trailer relative to a longitudinal centerline axis of the trailer;
    generating a steering command for guiding the trailer on the path based on the hitch angle and the kinematic relationship; and
    controlling steered wheels of the vehicle with a power-steering system based on the steering command.

2. The method of claim 1, wherein the desired curvature of the path is provided by a position of a rotatable knob.

3. The method of claim 1, wherein the user input commands a curvature path of the trailer that allows continuous backup of the trailer that is always below a calculated theoretical jackknife point.

* * * * *